US012639683B2

(12) United States Patent
Jiam et al.

(10) Patent No.: US 12,639,683 B2
(45) Date of Patent: *May 26, 2026

(54) SYSTEM AND METHOD FOR SINGLE PAGE BANNER

(71) Applicant: American Express Travel Related Services Company, Inc., New York, NY (US)

(72) Inventors: Michael Jiam, Phoenix, AZ (US); Vishal Mathur, Phoenix, AZ (US); Keshav Aswathnarayana Narsipur, Chandler, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/678,975

(22) Filed: May 30, 2024

(65) Prior Publication Data

US 2024/0311784 A1      Sep. 19, 2024

Related U.S. Application Data

(63) Continuation of application No. 17/498,878, filed on Oct. 12, 2021, now Pat. No. 12,045,788, which is a continuation of application No. 14/941,172, filed on Nov. 13, 2015, now abandoned.

(60) Provisional application No. 62/195,598, filed on Jul. 22, 2015.

(51) Int. Cl.
G06Q 20/12      (2012.01)
G06Q 20/38      (2012.01)
G06Q 20/40      (2012.01)
G06Q 30/02      (2023.01)
G06Q 30/0251      (2023.01)

(52) U.S. Cl.
CPC ........... *G06Q 20/12* (2013.01); *G06Q 20/382* (2013.01); *G06Q 20/40* (2013.01); *G06Q 30/02* (2013.01); *G06Q 30/0253* (2013.01)

(58) Field of Classification Search
None
See application file for complete search history.

(56) References Cited

U.S. PATENT DOCUMENTS

| | | | |
|---|---|---|---|
| 8,486,355 B2 | 7/2013 | Sutcliffe et al. | |
| 9,830,587 B1 | 11/2017 | Bell et al. | |
| 10,289,995 B1 | 5/2019 | Gailloux et al. | |
| 2005/0108418 A1 | 5/2005 | Bedi et al. | |

(Continued)

*Primary Examiner* — Jamie R Kucab
(74) *Attorney, Agent, or Firm* — Thomas | Horstemeyer, LLP

(57) ABSTRACT

A dynamic banner may be displayed in a merchant check out page sourced from a merchant server that may be customized to a particular user and/or merchant. The dynamic banner may be provided by a transaction server and may invite the user to select an offer. In response to the user's interaction with the banner, the characteristics of the merchant check out page may be changed, for example, a product may be discounted, and/or a new transaction account may be issued to the user by the transaction account provider server and used to complete the checkout process. In this manner, the merchant server and the transaction server may interact with a user within a single web page.

20 Claims, 6 Drawing Sheets

(56)        References Cited

U.S. PATENT DOCUMENTS

| | | | |
|---|---|---|---|
| 2010/0306072 A1* | 12/2010 | Ford, Jr. .............. | G06Q 20/202 |
| | | | 705/38 |
| 2011/0231235 A1 | 9/2011 | Macilwaine et al. | |
| 2012/0089481 A1 | 4/2012 | Iozzia et al. | |
| 2012/0323684 A1 | 12/2012 | Rothman et al. | |
| 2012/0323732 A1* | 12/2012 | Rothman .......... | G06Q 30/0277 |
| | | | 705/27.2 |
| 2013/0036374 A1 | 2/2013 | Melamed | |
| 2013/0110562 A1* | 5/2013 | Crawford .............. | G06Q 40/03 |
| | | | 705/5 |
| 2013/0198016 A1* | 8/2013 | Ter-Saakov ........ | G06Q 30/0277 |
| | | | 705/14.73 |
| 2014/0020073 A1 | 1/2014 | Ronda et al. | |
| 2014/0244488 A1 | 8/2014 | Kim et al. | |
| 2014/0344106 A1* | 11/2014 | Lee .................... | G06Q 30/0641 |
| | | | 705/26.8 |
| 2014/0373174 A1 | 12/2014 | Bao et al. | |
| 2015/0012425 A1 | 1/2015 | Mathew | |
| 2015/0058203 A1* | 2/2015 | Morozov ........... | H04L 63/0428 |
| | | | 705/39 |
| 2015/0188779 A1* | 7/2015 | McCanne .............. | H04L 63/10 |
| | | | 709/223 |
| 2016/0155160 A1* | 6/2016 | Walz .................... | G06Q 20/409 |
| | | | 705/26.1 |
| 2017/0161743 A1* | 6/2017 | Binder .................... | G06Q 20/24 |
| 2017/0228711 A1* | 8/2017 | Chawla ............... | G06Q 20/384 |

* cited by examiner

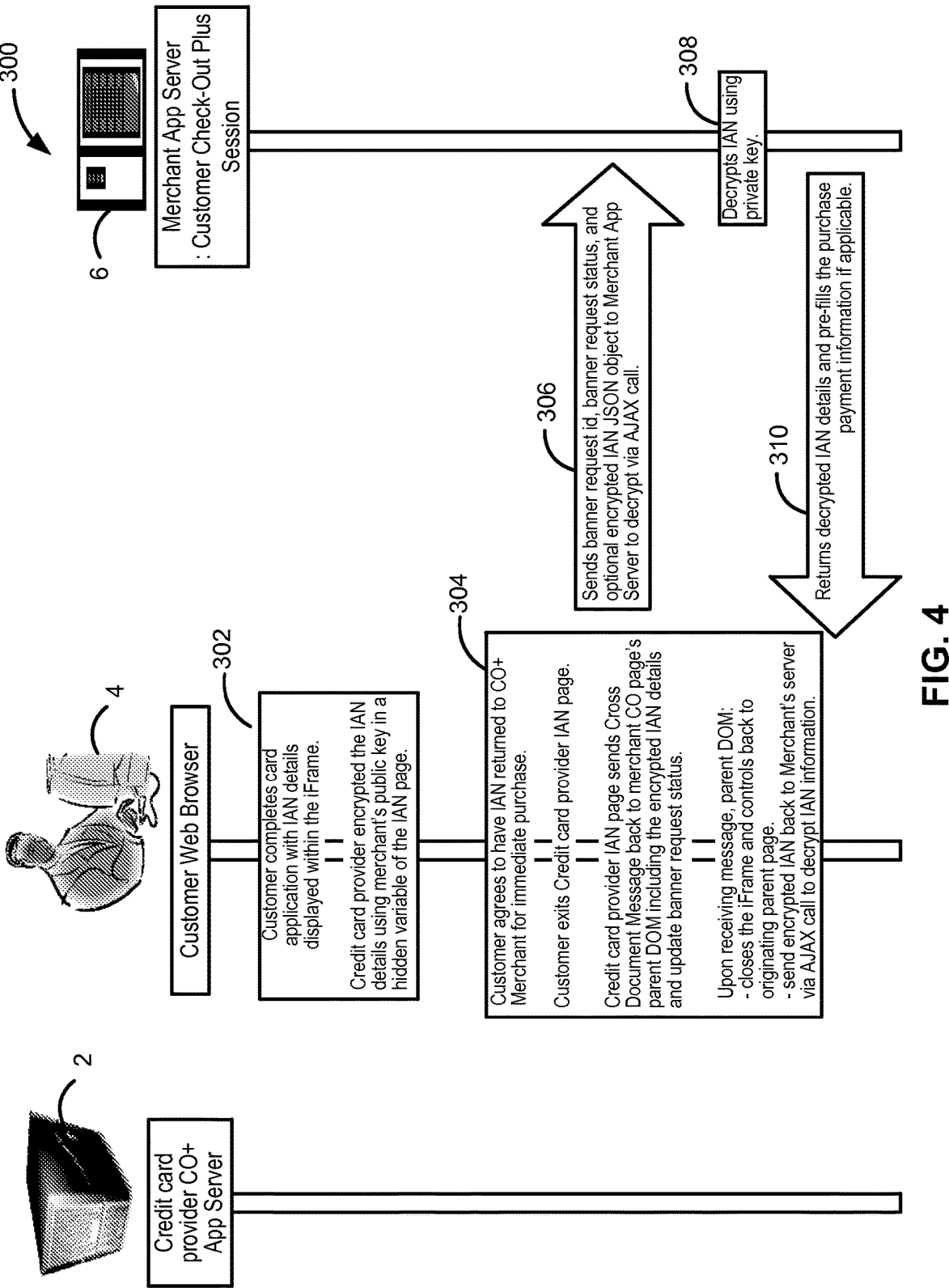

300

6

Merchant App Server : Customer Check-Out Plus Session

308

Decrypts IAN using private key.

306

Sends banner request id, banner request status, and optional encrypted IAN JSON object to Merchant App Server to decrypt via AJAX call.

310

Returns decrypted IAN details and pre-fills the purchase payment information if applicable.

4

302

Customer Web Browser

Customer completes card application with IAN details displayed within the iFrame.

Credit card provider encrypted the IAN details using merchant's public key in a hidden variable of the IAN page.

304

Customer agrees to have IAN returned to CO+ Merchant for immediate purchase.

Customer exits Credit card provider IAN page.

Credit card provider IAN page sends Cross Document Message back to merchant CO page's parent DOM including the encrypted IAN details and update banner request status.

Upon receiving message, parent DOM:
- closes the iFrame and controls back to originating parent page.
- send encrypted IAN back to Merchant's server via AJAX call to decrypt IAN information.

2

Credit card provider CO+ App Server

SYSTEM AND METHOD FOR SINGLE PAGE BANNER

CROSS-REFERENCE TO RELATED APPLICATIONS

This application is a continuation of, claims priority to, and the benefit of, U.S. Ser. No. 17/498,878, filed on Oct. 12, 2021, and entitled "SYSTEM AND METHOD FOR SINGLE PAGE BANNER INTEGRATION," which is a continuation of, claims priority to, and the benefit of, U.S. Ser. No. 14/941,172 filed Nov. 13, 2015, and entitled "SYSTEM AND METHOD FOR SINGLE PAGE BANNER INTEGRATION," which is a nonprovisional of, and claims priority to, and the benefit of U.S. Provisional Application No. 62/195,598, entitled "SYSTEM AND METHOD FOR SINGLE PAGE BANNER INTEGRATION," filed on Jul. 22, 2015, which is hereby incorporated by reference in its entirety.

FIELD

The present disclosure relates to the integration of banners into third party websites.

BACKGROUND

Merchants may desire to integrate banners and/or transaction account application processes into their online shopping cart pages. However, prior solutions involve significant custom coding in order to customize the merchant shopping cart pages for the banner and/or transaction account application process, present significant data security challenges, and slow the user experience as the merchant and the transaction account provider typically communicate through a business-to-business backchannel at various steps of the browser interaction by the user with the merchant.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 4 illustrates a method of instant account number (IAN) to checkout return, in accordance with various embodiments;

DETAILED DESCRIPTION

Figure 1:
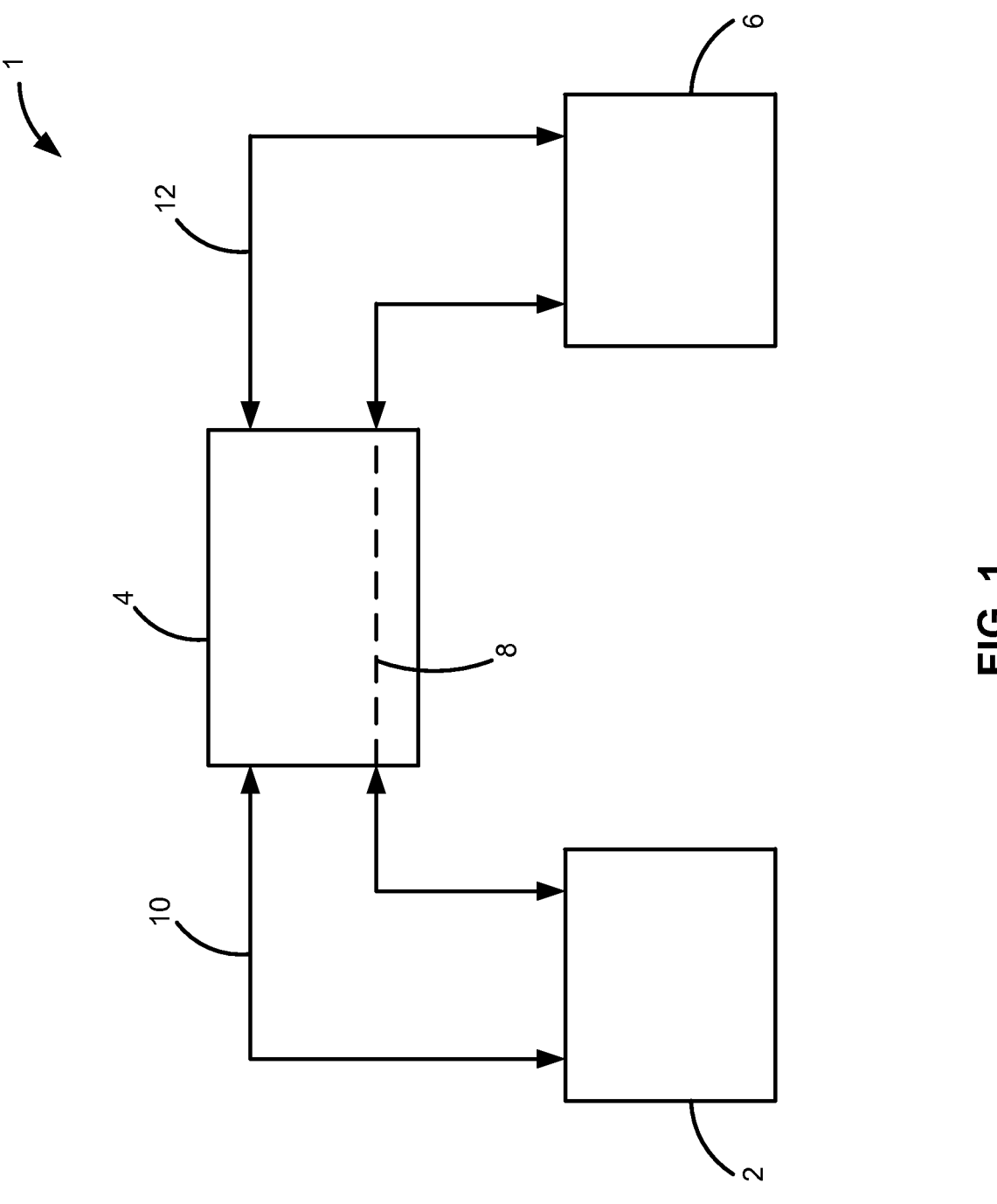
FIG. 1 illustrates an exemplary cross-domain scripting cross-document messaging offer integration system, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Transaction account providers and merchants may desire to engage together as distribution and/or cobrand partners having an integrated online digital acquisition process leveraged to create a streamlined acquisition stream for transaction account applicants using merchant upfunnel shopping flows and shopping cart applications. By implementing cross domain scripting and cross document messaging, the digital acquisition process may be integrated to the upfunnel shopping and shopping cart experience and yet involve minimal upfunnel and cart customization by the merchant. For instance, a merchant may integrate the digital acquisition process into the upfunnel shopping and shopping cart experience within mere hours of coding and related integration work, versus previous efforts which required extensive and challenging coding and integration efforts to develop. As mentioned, merchants may desire to integrate banners and/or transaction account application processes into their online shopping cart pages. However, prior solutions may often involve prohibitively lengthy development efforts for which the merchant often lacks the time or resources to implement. Importantly, systems and methods are presented herein which provide for strikingly less resource intensive development commitments from merchants, all the while providing strong security features and a responsive user experience.

Also, in this manner, scalability may be enhanced and page reloads may be minimized. For instance, a banner may be placed within a merchant's "checkout journey" (e.g., the process whereby a user selects and ultimately purchases items from the merchant). Integrated customer data may be exchanged between the user and merchant, the user and transaction account provider, and the merchant and transaction account provider. Integrated customer data may comprise data pre-filled into forms of the merchant and/or the transaction account provider based on data previously provided to the other. Integrated data may also comprise account details, such as where a transaction account application process may be incorporated into the checkout process whereby a user may apply for, receive, and use a transaction account for the checkout transaction, and whereby the transaction account provider may provide contextually relevant incentives. For example, the transaction account provider may display a discounted total of the checkout sum associated with a transaction account application such as a price reduction, display a reward points sum, and/or display an upsell or related product offer based on prior transaction histories. More specifically, a banner placed in the checkout journey may exchange integrated customer data, and upon a user clicking the banner, open a modal window on top of the merchant parent window, where a credit or charge card application may be completed and instantly decisioned. In accordance with various embodiments, modal windows may comprise various types of windows. For instance, while iFrames are discussed throughout, in various embodiments, a browser window, a browser tab, and/or the like may be implemented. Moreover, such interaction may proceed without (or with minimal) business-to-business integration. Rather, all the assets starting with the banner and ending with the conclusion of the checkout journey may be hosted exclusively by the transaction account provider, and yet displayed properly integrated with the merchant shopping cart experience by virtue of the implemented cross domain scripting, whereby merchant cart customization may be minimized. By virtue of the implemented cross document messaging, window reloads upon data exchange may be reduced and/or eliminated.

In accordance with various embodiments, the systems and methods disclosed herein securely integrate consumer (e.g., card member) acquisition by the transaction account provider as an experience within an upfunnel shopping and/or checkout journey of a merchant. Personally identifiable information (PII) may be autofilled into documents of the transaction account provider and/or the merchant. The population of the documents may be in real time, or substantially real time. Moreover, the real time or substantially real time approval and issuance of a transaction account by the transaction account provider to the user may be supplemented by card account pass back to the merchant checkout journey for immediate (or expedited) payment. Furthermore, banners (e.g., prescreened offer requests) may be presented based on the PII. By virtue of cross domain scripting and cross document messaging, sharing of certificates between the transaction account provider and the merchant may be avoided or minimized, thus improving the efficiency of the interaction. Similarly, account information HTTPS form post and handover of PII from the transaction account provider to the merchant may also be avoided or minimized. In this manner, account information may pass back from the transaction account provider to the merchant, and PII may pass from the merchant to the transaction account provider without the need for sharing of certificates (or with reduced sharing of certificates).

As will be discussed further herein, various processes and systems involve the exchange of sensitive information, such as personally identifying information, transaction account numbers, and/or the like. For instance, as part of an onboarding process, a merchant may share a CA-signed public SSL certificate which was installed within a trust-store of a transaction account company application server. The merchant may also specify the domain of their shopping cart experience, and/or payment pages in which transaction account company hosted banners (e.g., dynamic banner JavaScript banners) will be sourced. The transaction account company may have assigned a merchant-id to the merchant, such that the merchant is identified. Moreover, further security may be implemented, such as digital signature signing and verification based on the PKI and Public Key cryptography, as well as secured RESTful Service over HTTPS POST via transaction account company hosted JavaScript. Furthermore, white list domain validation may be applied against the domain of the shopping cart experience and/or payment pages. Furthermore, the payment page may be an HTTPS page, and not an HTTP page. Time-constraint, single-use security tokens for each banner request may be implemented as well as secure HTML5 cross document messaging and PKI/AES encrypted instant account number (IAN) information. Finally, the transaction account company hosted aspects may ensure that IAN information is returned only once to the original merchant page identified previously in the merchant's checkout journey, and subject to user consent.

With reference to FIG. 1, a cross-domain scripting cross-document messaging offer integration system 1 (CDS-CDM integration system 1) may comprise a transaction account provider server 2 and a merchant server 6. A web browser 4 may communicate with both the transaction account provider server 2 and the merchant server 6. In this manner, a banner may be sourced from a transaction account provider server 2 and integrated into a shopping cart experience (sourced from a merchant server 6), which is displayed inside a web browser 4. As such, the transaction account provider server 2 and the merchant server 6 may not be in direct communication. However, the web browser 4 may access transaction account provider resources hosted on the transaction account provider server 2 via a transaction account provider resource connection 10, and the web browser 4 may access merchant resources hosted on the merchant server 6 via a merchant resource connection 12, so that the web browser 4 may create a logical server intermediation connection 8. Data entered by a user via the web browser 4 may be cross-populated to both the transaction account provider server 2 and the merchant server 6. Data retrieved individually from the transaction account provider server 2 and the merchant server 6 may be securely passed to the other of the transaction account provider server 2 and the merchant server 6.

Figure 2:
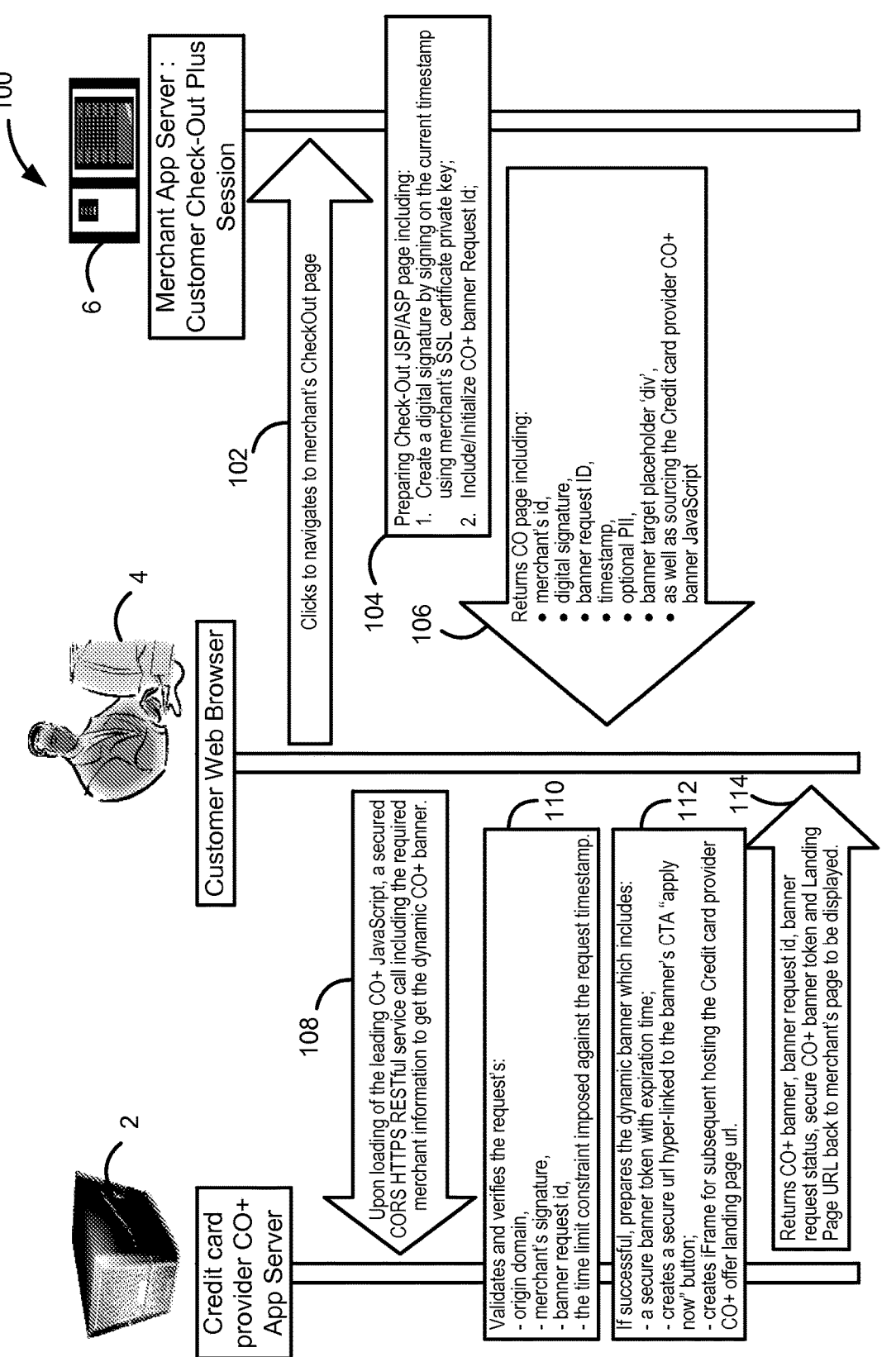
FIG. 2 illustrates a banner display method, in accordance with various embodiments.

Having discussed a CDS-CDM integration system 1, various methods and processes may be implemented by various aspects of the CDS-CDM integration system 1. For example, with reference to FIG. 2, a banner display method 100 is disclosed. The banner display method 100 may involve various interoperations between a web browser 4 and a merchant server 6, and between a web browser 4 and a transaction account provider server 2. For example, a web browser 4 may receive a navigation command directing the web browser 4 to navigate to a merchant check out page (e.g., shopping cart experience/merchant checkout journey) (step 102). In response, the merchant server 6 may prepare a checkout webpage, for instance, a JSP/ASP webpage. This may comprise, for example, creating a digital signature by signing on the current timestamp using the merchant's SSL certificate private key. Moreover, this may involve setting up personally identifiable information (PII) receiver fields of the merchant check out page in preparation for the collection of personally identifiable information (PII) from the user via the web browser 4 (step 104).

After preparing the checkout webpage, the merchant server 6 may serve the checkout webpage to the web browser 4. The served webpage may include the merchant-id, the digital signature, PII, a banner request ID that uniquely identifies a request for banner to be placed on the webpage, a time stamp, a placeholder for placement of a banner, and/or banner sourcing JavaScript (collectively, "returned webpage content") (step 106).

Upon loading of the checkout page, a secured CORS HTTPS RESTful service call is instantiated from the web browser 4 including at least a portion of the returned webpage content. For instance, the portion of returned webpage content may include a portion to get a dynamic checkout banner for display by the web browser 4 (Step 108). The transaction account provider server 2 may be configured to receive the secured CORS HTTPS RESTful service call.

The transaction account provider server 2 may take various actions in response to the CORS HTTPS RESTful service call. For instance, the transaction account provider server 2 may validate and verify aspects of the service call, for instance, a portion of the returned webpage content. For instance, the transaction account provider server 2 may validate and verify the originating domain of returned webpage content, the merchants digital signature, the banner request ID, the time stamp against a lime limit constraint, and/or the like (Step 110).

In response to the validation and verification step being satisfied, the transaction account provider server 2 may prepare a dynamic banner comprising one or more of a secure banner token with an expiration date, a secure URL linked to a portion of the banner (e.g., an "APPLY NOW" button whereby a user may apply for a transaction account of the transaction account provider), and/or a modal window, such as an iFrame for subsequent hosting of a landing page URL, such as in response to a user interaction with the banner such as clicking an "APPLY NOW" button (Step 112). In various embodiments, a browser tab and/or browser window (such as in addition to the iFrame or in lieu of an iFrame, may be contemplated).

Subsequently, the transaction account provider server 2 may return to the web browser 4 the created banner, and/or the banner request ID, a banner request status, a secure banner token, and a landing page URL for hosting in the iFrame (Step 114).

Thus, one may appreciate that in loading the page having features derived from both the merchant server 6 and the transaction account provider server 2, the web browser 4 accesses both servers, whereas neither server communicates directly with the other, nor must the page be refreshed to effectuate the transfer of data via the web browser 4 among the two servers 2 and 6. Rather, a seamless (or near seamless) user experience manifests, wherein the browser loads a website with content from the merchant server 6 and a banner from the transaction account provider server 2, and with particular information from one or the other server made available to the counterpart server and/or pages therefrom, by virtue of cross-document scripting and cross domain messaging as disclosed herein. Moreover, one will appreciate that the banner may be dynamic for different users or different merchants and the banner is secured against being moved to another website.

Figure 3:
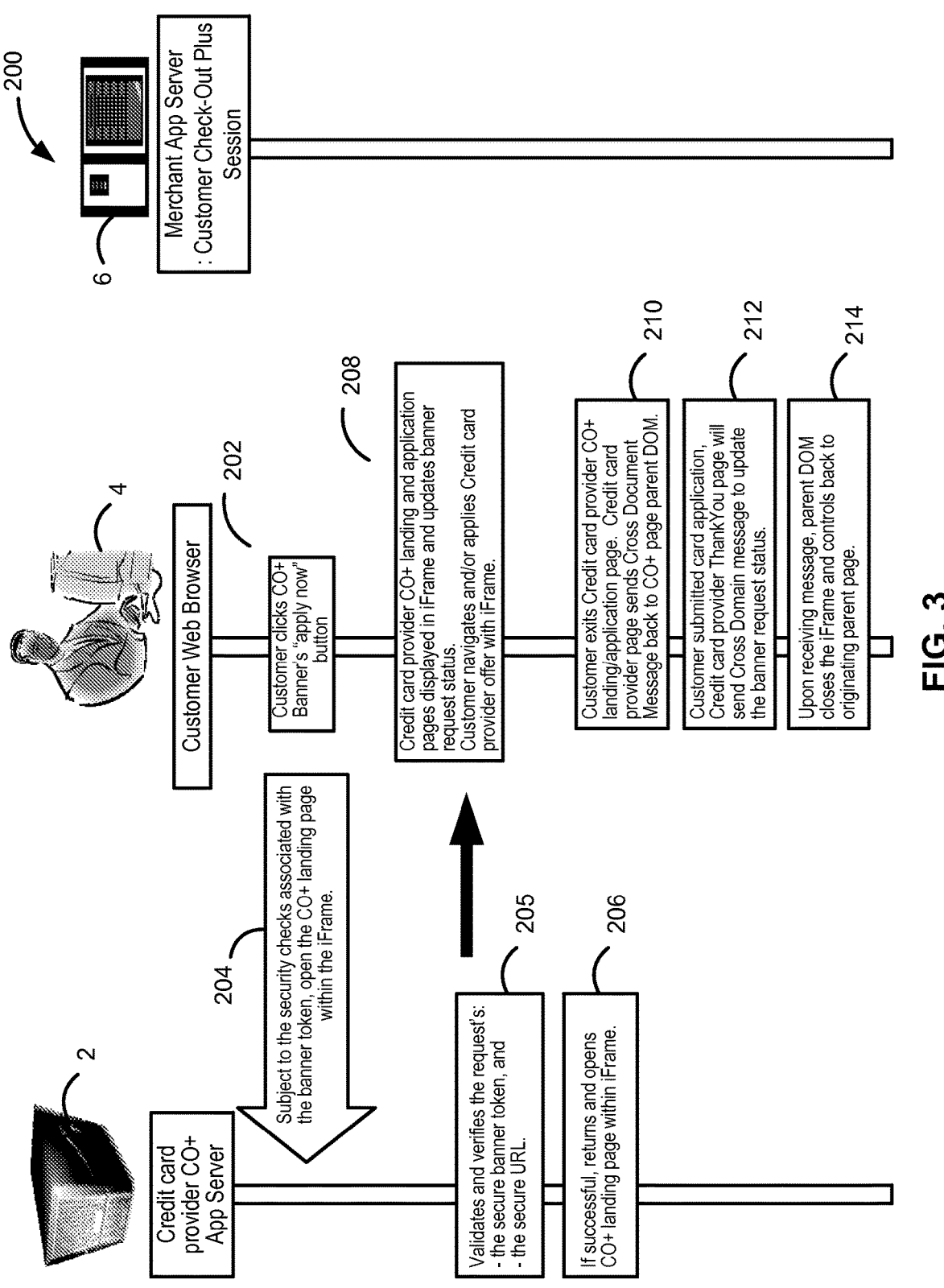
FIG. 3 illustrates a customer application method, in accordance with various embodiments.

With reference to FIG. 3, a customer application method 200 is disclosed. For instance, as discussed with reference to step 112 above, a banner may invite a user-banner interaction, such as clicking an "APPLY NOW" button. A customer application method 200 may be launched in response to a user-banner interaction. For instance, in various embodiments a customer may click an "APPLY NOW" button (step 202) presented in a banner in a web browser 4 (step 202). The web browser 4 may request that the transaction account provider server 2 open a landing page within the iFrame, for instance a banner response offer which may include an offer to apply for a transaction account. This request may be subject to various security checks, such as may be associated with a secure banner token (step 204). For instance, step 204 may more specifically include wherein the transaction account provider server 2 may validate and verify the request, for instance, the credit-card provider may validate and verify the secure URL linked to a portion of the banner corresponding to the user-banner interaction and/or the secure banner token with an expiration date of the dynamic banner (step 205). In response to successful validating and verifying, the transaction account provider server 2 may return and open the landing page within the iFrame (step 206). As such, step 205 and 206 may be considered sub-steps of step 204.

Within the web browser 4, landing and/or application pages displayed in the iFrame may be displayed and the banner request status may be updated to indicate this display (Step 208). Consequently, the user may interact further with the content within the iFrame, such as by applying for a transaction account. The user may exit the page(s) displayed in the iFrame (Step 210). In response to the user exiting the page(s), the content provided within the iFrame from the transaction account provider server 2 may send a cross document message to the content provided from the merchant the web browser 4 may send cross document message(s) to at least one of the merchant check out page provided from the merchant server 6 and/or to the merchant server 6 and/or updating the banner request status (Step 212). In response, the merchant check out page provided from the merchant server 6 may close the iFrame (Step 214).

In various embodiments the content provided within the iFrame from the transaction account provider server 2 may include an IAN. The IAN may be sent via a cross document message to at least one of the merchant checkout page provided from the merchant server 6 and/or the merchant server 6, as mentioned. As such, with reference to FIG. 4, a method of IAN to checkout return 300 may comprise various steps discussed further herein below. For instance, as mentioned, within the web browser 4, the user may complete a transaction account application, with the IAN details displayed in the iFrame (step 302).

The IAN may be provided from the transaction account provider server 2 to the web browser 4 in a format that comprises an encrypted variable encrypted using the merchant's public key in a hidden variable of the displayed webpage displayed in the web browser 4. The user may further agree to have the IAN returned to the merchant page for forwarding to a merchant server 6 for immediate use in completing a proposed transaction (Step 304). The customer may exit the IAN page displayed in the iFrame and that page may send a banner request id, a banner request status, and/or encrypted IAN JSON object to the merchant server 6 for decryption via an AJAX call (Step 306). The merchant server 6 may decrypt the IAN using the merchant's private key (Step 308). Subsequently, the merchant server 6 may return the decrypted IAN details and pre-fill the purchase payment information into the shopping t experience of the web browser 4 (step 310).

Figure 6:
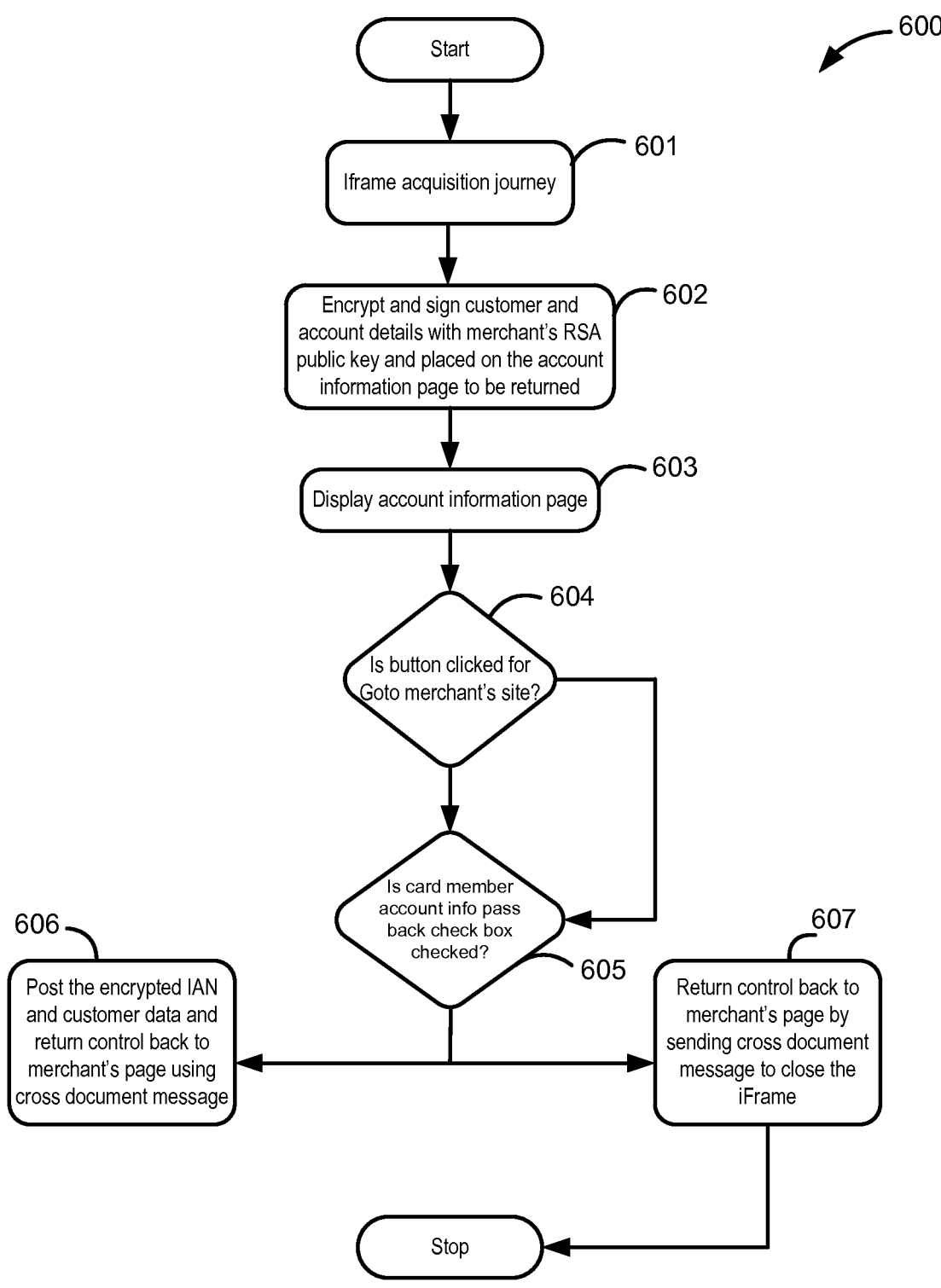
FIG. 6 illustrates an account information pass back method, in accordance with various embodiments.

In various embodiments, the return of the provision of the IAN from the transaction account provider server 2 to the web browser 4 and then the pre-filling of the purchase payment information and/or decrypted IAN details into the shopping cart experience of the merchant server 6 as depicted in the web browser 4 may involve various other aspects. For instance, with reference to FIG. 6, an account information pass back method 600 is depicted. For instance, an iFrame acquisition journey 601 may begin with encryption and signature of customer and account details with merchant's RSA public key and placement on the page displayed in the iFrame, such as in step 302 (step 602). This page may be displayed to a user in the web browser 4, for instance, in a modal window, such as an iFrame of the web browser 4 (step 603). Moreover, in various embodiments, the page may be displayed in a browser lab or browser window.

In response to the user selecting to activate a return-to-merchant aspect of the page (step 604), such as clicking a button to return to a merchant's shopping cart, the web browser 4 may evaluate whether a box authorizing the pre-fill the transaction information with the IAN details is checked (step 605). If the pre-fill is not authorized, control may be returned to the merchant's shopping cart by the transmission of a cross document message to close the iFrame (step 607). If the pre-fill is authorized, the encrypted IAN and customer data may be posted to the merchant's shopping cart by the transmission of a cross document message (step 606).

In various instances throughout, the banner request status is discussed, such as with reference to the banner request status being changed. Accordingly, a banner may have different banner request statuses over a banner request lifecycle. For instance, with reference to FIG. 5 as a banner request status diagram 500 may have a shown (S) status 502, or a incompleted (I) status 503, or an approved (A) status 504, or a pending (P) status 505, or a suppressed (R) status 506, or a minimum spending threshold reached (T) status 507, or an authentication failed (F) status 508, or an IAN passed back (B) status 509. The status may change in response to various steps of various methods. For instance, a banner or portion of banner specific to a merchant other than the merchant associated with the merchant server 6 may be suppressed (R status 506). A banner may not be displayed if a minimum spending threshold (T) 507 is not reached, for instance, if the banner were to promote a discount greater than the amount to be spent. A banner may be shown 502, but the banner may immediately be expired upon the failure of any of the authentication or security features (F) 508 disclosed herein.

Figure 5:
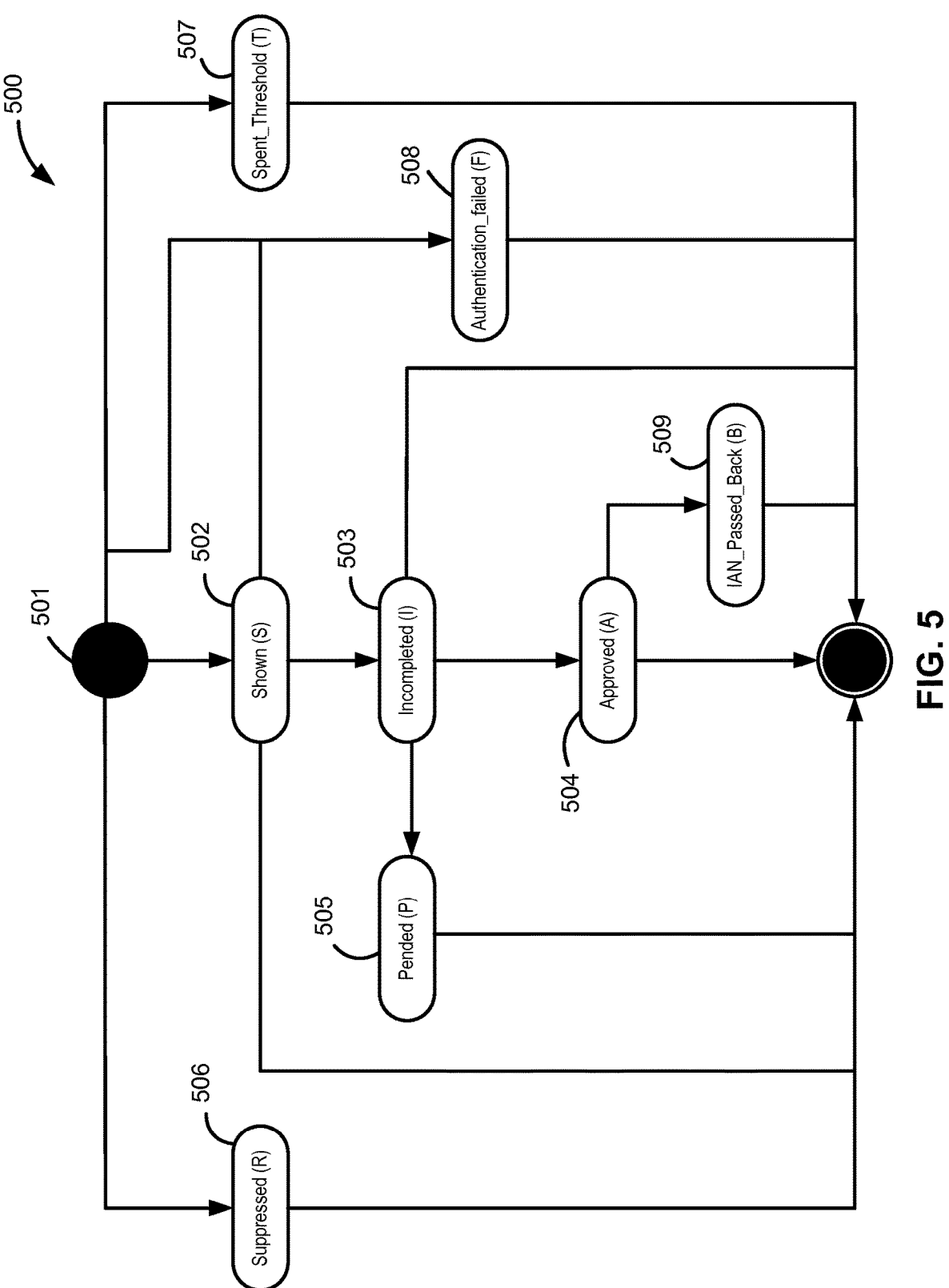
FIG. 5 illustrates a banner request status diagram, in accordance with various embodiments.

A banner request status may be incomplete (I) 503 in response to a user clicking a shown banner. A banner request status may be pending 505 in response to an IAN provisioning decision being in progress. The status may be approved (A) in response to an IAN provisioning decision being approved. An IAN passed back status (B) 509 may be set in response to the encrypted IAN being posted to the merchant's shopping cart by the transmission of a cross document message (see step 606; FIG. 5).

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTVQ, Pandora®, xBox®, Sony® Playstation®), a uniform resource locator ("URL"), a document (e.g . . . a Microsoft Word document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/20000, Windows XP®, Windows Vista®, Windows 70, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g . . . ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Therefore, the following is claimed:

1. A method comprising:

receiving, by a web browser executing on a client device, a merchant check out page from a merchant server;

displaying, by the web browser, the merchant check out page on the client device by loading webpage content received from the merchant server and by including a banner received from a transaction server, the banner comprising a uniform resource locator (URL) that is configured to display a transaction account application associated with the transaction server;

displaying, by the web browser, a modal window for the transaction account application based at least in part on an activation of the URL for the banner;

receiving, by the web browser from the transaction server, an encrypted account number in association with an approval of the transaction account application, the encrypted account number being generated using a merchant public key;

transmitting, by the web browser, the encrypted account number to the merchant server for decryption; and updating, by the web browser, the merchant check out page with a decrypted account number populated based at least in part on receiving the decrypted account number from the merchant server.

2. The method of claim 1, further comprising:

transmitting, by the web browser, a banner request to a transaction server in response to receiving the merchant check out page, the banner request comprising an originating domain associated with the webpage content.

3. The method of claim 1, wherein the banner comprises a banner token with an expiration date, the banner token being configured to authorize the activation of the URL for the banner based at least in part on the expiration date.

4. The method of claim 1, wherein the merchant check out page further comprises a digital signature signed on a current timestamp using a merchant private key.

5. The method of claim 1, wherein transmitting the encrypted account number to the merchant server for decryption further comprises transmitting an encrypted JavaScript Object Notation (JSON) Object to the merchant server.

6. The method of claim 1, wherein transmitting the encrypted account number to the merchant server further comprises transmitting the encrypted account number via a cross document message to the merchant server.

7. The method of claim 1, wherein receiving the encrypted account number further comprises receiving the encrypted account number via the modal window.

8. A system, comprising:

a client device that comprises a processor;

a memory; and machine-readable instructions stored in the memory that, when executed by the processor, cause the client device to at least:

receive a merchant check out page from a merchant server;

display the merchant check out page on the client device by loading webpage content received from the merchant server and by including a banner received from a transaction server, the banner comprising a uniform resource locator (URL) that is configured to display a transaction account application associated with the transaction server;

display a modal window for the transaction account application based at least in part on an activation of the URL for the banner;

receive, from the transaction server, an encrypted account number in association with an approval of the transaction account application, the encrypted account number being generated using a merchant public key;

transmit the encrypted account number to the merchant server for decryption; and update the merchant check out page with a decrypted account number populated based at least in part on receiving the decrypted account number from the merchant server.

9. The system of claim 8, wherein the machine-readable instructions, when executed by the processor, cause the client device to at least:

transmit a banner request to a transaction server in response to receiving the merchant check out page, the banner request comprising an originating domain associated with the webpage content.

10. The system of claim 8, wherein the banner comprises a banner token with an expiration date, the banner token being configured to authorize the activation of the URL for the banner based at least in part on the expiration date.

11. The system of claim 8, wherein the merchant check out page further comprises a digital signature signed on a current timestamp using a merchant private key.

12. The system of claim 8, wherein transmitting the encrypted account number to the merchant server for decryption further comprises transmitting an encrypted JavaScript Object Notation (JSON) Object to the merchant server.

13. The system of claim 8, wherein transmitting the encrypted account number to the merchant server further comprises transmitting the encrypted account number via a cross document message to the merchant server.

14. The system of claim 8, wherein receiving the encrypted account number further comprises receiving the encrypted account number via the modal window.

15. A non-transitory computer program having computer executable instructions stored thereon that, if executed by a client device, cause the client device to at least:

receive a merchant check out page from a merchant server;

display the merchant check out page on the client device by loading webpage content received from the merchant server and by including a banner received from a transaction server, the banner comprising a uniform resource locator (URL) that is configured to display a transaction account application associated with the transaction server;

display a modal window for the transaction account application based at least in part on an activation of the URL for the banner;

receive, from the transaction server, an encrypted account number in association with an approval of the transaction account application, the encrypted account number being generated using a merchant public key;

transmit the encrypted account number to the merchant server for decryption; and update the merchant check out page with a decrypted account number populated based at least in part on receiving the decrypted account number from the merchant server.

16. The non-transitory computer program of claim 15, the computer executable instructions, if executed by the client device, cause the client device to at least:

transmit a banner request to a transaction server in response to receiving the merchant check out page, the banner request comprising an originating domain associated with the webpage content.

17. The non-transitory computer program of claim 15, wherein the banner comprises a banner token with an expiration date, the banner token being configured to authorize the activation of the URL for the banner based at least in part on the expiration date.

18. The non-transitory computer program of claim 15, wherein the merchant check out page further comprises a digital signature signed on a current timestamp using a merchant private key.

19. The non-transitory computer program of claim 15, wherein transmitting the encrypted account number to the merchant server for decryption further comprises transmitting an encrypted JavaScript Object Notation (JSON) Object to the merchant server.

20. The non-transitory computer program of claim 15, wherein receiving the encrypted account number further comprises receiving the encrypted account number via the modal window.

\* \* \* \* \*